(12) United States Patent
Sharnagat et al.

(10) Patent No.: US 11,669,881 B2
(45) Date of Patent: Jun. 6, 2023

(54) QUERY INTENT MAPPING

(71) Applicant: Walmart Apollo, LLC, Bentonville, AR (US)

(72) Inventors: Rahul D. Sharnagat, Sunnyvale, CA (US); Hrushikesh Mohapatra, Sunnyvale, CA (US); Sreenivasa Prasad Sista, Cupertino, CA (US)

(73) Assignee: Walmart Apollo, LLC, Bentonville, AR (US)

( * ) Notice: Subject to any disclaimer, the term of this patent is extended or adjusted under 35 U.S.C. 154(b) by 448 days.

(21) Appl. No.: 16/777,486

(22) Filed: Jan. 30, 2020

(65) Prior Publication Data

US 2021/0241341 A1 Aug. 5, 2021

(51) Int. Cl.
*G06Q 30/00* (2023.01)
*G06Q 30/0601* (2023.01)
*G06F 16/9536* (2019.01)

(52) U.S. Cl.
CPC ..... *G06Q 30/0627* (2013.01); *G06F 16/9536* (2019.01); *G06Q 30/0603* (2013.01)

(58) Field of Classification Search
CPC ............ G06Q 30/0627; G06Q 30/0603; G06F 16/9536
USPC ................................................ 705/26.1–27.2
See application file for complete search history.

(56) References Cited

U.S. PATENT DOCUMENTS

2009/0070299 A1* 3/2009 Parikh .................. G06F 16/334
707/999.005

OTHER PUBLICATIONS

Y. -C. Lin, A. Datta and G. D. Fabbrizio, "E-commerce Product Query Classification Using Implicit User's Feedback from Clicks," 2018 IEEE International Conference on Big Data (Big Data), 2018, pp. 1955-1959, doi: 10.1109/BigData.2018.8622008. (Year: 2018).*

* cited by examiner

*Primary Examiner* — Anand Loharikar
(74) *Attorney, Agent, or Firm* — Morgan, Lewis & Bockius LLP; Manita Rawat (57) ABSTRACT

An approach is disclosed for mapping an intent of a query. The approach receives query data for one or more queries. The approach determines product type data of the one or more queries. The approach determines attribute data for the determined product type data. The attribute data includes sequence attribute data and sequence value data. The approach retrieves catalog data for one or more items that include product type data that matches the determined product type data. The catalog data includes catalog attribute data and catalog value data. The approach determines engagement data for the one or more received queries. The engagement data includes a number of times customers interacted with a retrieved item for a respective query. The approach determines cumulative engagement data based on the retrieved catalog data and the determined engagement data. The approach generates a probability and an evaluation score based on the cumulative engagement data.

19 Claims, 10 Drawing Sheets

| Query | Product type | Sequence Attribute | Sequence Value |
|---|---|---|---|
| Opal necklace _202_ | Necklace | Product type Description | Opal _414_ |
| Simulated-opal necklace _404_ | Necklace | Product type Description _426_ | Simulated opal _416_ |
| Topaz necklace _406_ | Necklace | Product type Description _428_ | Topaz _418_ |
| Woman's Opal necklace _408_ | Necklace | Product type Description _430_ | Woman's and Opal _420_ |

| Item | Catalog Attribute 504 | Catalog Value 502 |
|---|---|---|
| 1 | Gemstone type | Opal |
| 2 | Gemstone type | Simulated-opal |
| 3 | Gemstone type | Topaz |
| 4 | Gemstone type | Aquamarine |
| 5 | Gemstone type | Turqoise |
| 6 | Gemstone type | Topaz |
| 7 | Gemstone type | Zircone |
| 8 | Gemstone type | Opal |

FIG. 5

| Query | Item | Engagement count |
|---|---|---|
| Opal necklace | 1 | 100 |
| Opal necklace | 2 | 70 |
| Opal necklace | 3 | 30 |
| Opal necklace | 4 | 10 |
| Simulated-opal necklace | 2 | 50 |
| Simulated-opal necklace | 3 | 10 |
| Simulated-opal necklace | 5 | 5 |
| Simulated-opal necklace | 1 | 3 |
| Topaz necklace | 6 | 70 |
| Topaz necklace | 2 | 30 |
| Topaz necklace | 1 | 10 |
| Topaz necklace | 7 | 5 |
| WOMAN'S OPAL NECKLACE | 8 | 100 |
| WOMAN'S OPAL NECKLACE | 1 | 40 |
| WOMAN'S OPAL NECKLACE | 4 | 5 |

FIG. 6

| Product Type 410 | Sequence Attribute 412 | Sequence Value 420 | Catalog Attribute 504 | Catalog Value 502 | Cumulative Engagement Count 700 |
|---|---|---|---|---|---|
| Necklace | Product Type Description | Opal | Gemstone Type | Opal | 240 |
| Necklace | Product Type Description | Opal | Gemstone Type | Simulated-opal | 30 |
| Necklace | Product Type Description | Opal | Gemstone Type | Topaz | 30 |
| Necklace | Product Type Description | Opal | Gemstone Type | Aquamarine | 15 |

| Product Type 410 | Sequence Attribute 412 | Sequence Value 420 | Catalog Attribute 504 | Catalog Value 502 | Probability 800 | Levenshtein Similarity 802 | Jaccard Similarity 804 | Evaluation Score 210 |
|---|---|---|---|---|---|---|---|---|
| Necklace | Product type Description | Opal | Gemstone Type | Opal | 0.94 | 1 | 1 | 0.97 |
| Necklace | Product type Description | Opal | Gemstone Type | Simulated -opal | 0.12 | 0.3 | 0 | 0.21 |

702 — (first data row)
704 — (second data row)

FIG. 8

|  | Conventional Mapping System | System 102 | % Lift |
|---|---|---|---|
| Binary ndcg | 0.7535 | 0.762 | 1.12% |
| Error Rate | 332 (8.8%) | 261 (6.9%) | -21.38% |

QUERY INTENT MAPPING

TECHNICAL FIELD

The disclosure relates generally to query mapping, and more particularly, mapping an intent of a query.

BACKGROUND

One of the many ways a customer may search for an item on an e-commerce website is by entering a query for the item in the e-commerce website's search bar. The query typically includes attributes of an item described in a user's language and/or vocabulary. To generate search results for the query, the e-commerce website may map the attributes within the query to the attributes of the items listed for sale on the e-commerce website.

For less complex queries, such as a user entering "bed cover" into the search bar, conventional mapping techniques may provide search results that match the query. For example, a conventional mapping technique may output any search results for items that include the terms "bed" and "cover." However, the conventional mapping technique may not be able to provide matches or partial matches to queries that include contextual descriptions. For example, a user may enter the query "waterproof bed cover" into the search bar, in which "waterproof" is an attribute of the item "bed cover". That is, the user's intent of the query is to view "bed covers" that are "waterproof" in nature. However, the conventional mapping technique may provide a variety of items in the search results that include the term "bed" and "cover," but are non-waterproof in nature. Moreover, the conventional mapping technique may provide items in the search results that include the terms "bed," "cover," and "waterproof;" however, may fail to provide items that are, for example, "terrycloth" or "100% polyester."

SUMMARY

The summary of the disclosure is given to aid understanding of mapping an intent of a query, and not with an intent to limit the disclosure. The present disclosure is directed to a person of ordinary skill in the art. It should be understood that various aspects and features of the disclosure may advantageously be used separately in some instances, or in combination with other aspects and features of the disclosure in other instances. Accordingly, variations and modifications may be made to the systems, devices, and their methods of operation to achieve different effects. Certain aspects of the present disclosure provide a system, method, and non-transitory computer readable medium for mapping an intent of a query and providing items related to the intent of the query.

In one or more aspects, the disclosed technology relates to a system that comprises a memory having instructions stored thereon, and a processor configured to read the instructions. In one or more cases, the processor is configured to read the instructions to receive query data for one or more queries. In one or more cases, the processor is configured to read the instructions to determine product type data of the one or more queries. In one or more cases, the processor is configured to read the instructions to determine attribute data for the determined product type data. In one or more cases, the attribute data includes sequence attribute data and sequence value data. In one or more cases, the processor is configured to read the instructions to retrieve catalog data for one or more items that include product type data that matches the determined product type data. In one or more cases, the catalog data includes catalog attribute data and catalog value data. In one or more cases, the processor is configured to read the instructions to determine engagement data for the one or more received queries. In one or more cases, the engagement data includes a number of times customers interacted with a retrieved item for a respective query. In one or more cases, the processor is configured to read the instructions to determine cumulative engagement data based on the retrieved catalog data and the determined engagement data. In one or more cases, the processor is configured to read the instructions to generate a probability and an evaluation score based on the cumulative engagement data.

In one or more other aspects, the disclosed technology relates to a method. In one or more cases, the method comprises receiving query data for one or more queries. In one or more cases, the method comprises determining product type data of the one or more queries. In one or more cases, the method comprises determining attribute data for the determined product type data. In one or more cases, the attribute data includes sequence attribute data and sequence value data. In one or more cases, the method comprises retrieving catalog data for one or more items that include product type data that matches the determined product type data. In one or more cases, the catalog data includes catalog attribute data and catalog value data. In one or more cases, the method comprises determining engagement data for the one or more received queries. In one or more cases, the engagement data includes a number of times customers interacted with a retrieved item for a respective query. In one or more cases, the method comprises determining cumulative engagement data based on the retrieved catalog data and the determined engagement data. In one or more cases, the method comprises generating a probability and an evaluation score based on the cumulative engagement data.

In yet one or more other aspects, the disclosed technology relates to a computer program product. In one or more cases, the computer program product comprises a non-transitory computer readable medium having program instructions stored thereon. In one or more cases, the program instructions may be executable by one or more processors. In one or more cases, the program instructions comprise receiving query data for one or more queries. In one or more cases, the program instructions comprise determining product type data of the one or more queries, determining attribute data for the determined product type data. In one or more cases, the attribute data includes sequence attribute data and sequence value data. In one or more cases, the program instructions comprise retrieving catalog data for one or more items that include product type data that matches the determined product type data. In one or more cases, the catalog data includes catalog attribute data and catalog value data. In one or more cases, the program instructions comprise determining engagement data for the one or more received queries. In one or more cases, the engagement data includes a number of times customers interacted with a retrieved item for a respective query. In one or more cases, the program instructions comprise determining cumulative engagement data based on the retrieved catalog data and the determined engagement data. In one or more cases, the program instructions comprise generating a probability and an evaluation score based on the cumulative engagement data.

BRIEF DESCRIPTION OF THE DRAWINGS

The features and advantages of the present disclosure will be better understood when read in conjunction with the figures provided. Embodiments are provided in the figures for the purpose of illustrating aspects, and/or features, of the various embodiments, but the claims should not be limited to the precise arrangements, structures, features, aspects, methods, processes, assemblies, systems, or devices shown, and the arrangements, structures, features, aspects, methods, processes, assemblies, systems, and devices shown may be used singularly or in combination with other arrangements, structures, features, aspects, methods, processes, assemblies, systems, and devices.

DETAILED DESCRIPTION

The following discussion omits or only briefly describes conventional features of the data processing environment, which are apparent to those skilled in the art. It is noted that various embodiments are described in detail with reference to the drawings, in which like reference numerals represent like drawing elements throughout the figures. Reference to various embodiments does not limit the scope of the claims attached hereto. Additionally, any examples set forth in this specification are intended to be non-limiting and merely set forth some of the many possible embodiments for the appended claims. Further, particular features described herein can be used in combination with other described features in each of the various possible combinations and permutations. The objectives and advantages of the claimed subject matter will become more apparent from the following detailed description of these embodiments in connection with the accompanying drawings.

Unless otherwise specifically defined herein, all terms are to be given their broadest possible interpretation including meanings implied from the specification as well as meanings understood by those skilled in the art and/or as defined in dictionaries, treatises, etc. It must also be noted that, as used in the specification and the appended claims, the singular forms "a," "an," and "the" include plural referents unless otherwise specified, and that the terms "comprises" and/or "comprising," when used in this specification, specify the presence or addition of one or more other features, aspects, steps, operations, elements, components, and/or groups thereof. Moreover, the terms "couple," "coupled," "operatively coupled," "operatively connected," and the like should be broadly understood to refer to connecting devices or components together either mechanically, electrically, wired, wirelessly, or otherwise, such that the connection allows the pertinent devices or components to operate (e.g., communicate) with each other as intended by virtue of that relationship.

Embodiments of the disclosure relate generally to query mapping, and more particularly, to mapping an intent of a query. Embodiments that map query intent and provide items for a query based on query intent mapping are described below with reference to the figures.

Figure 1:
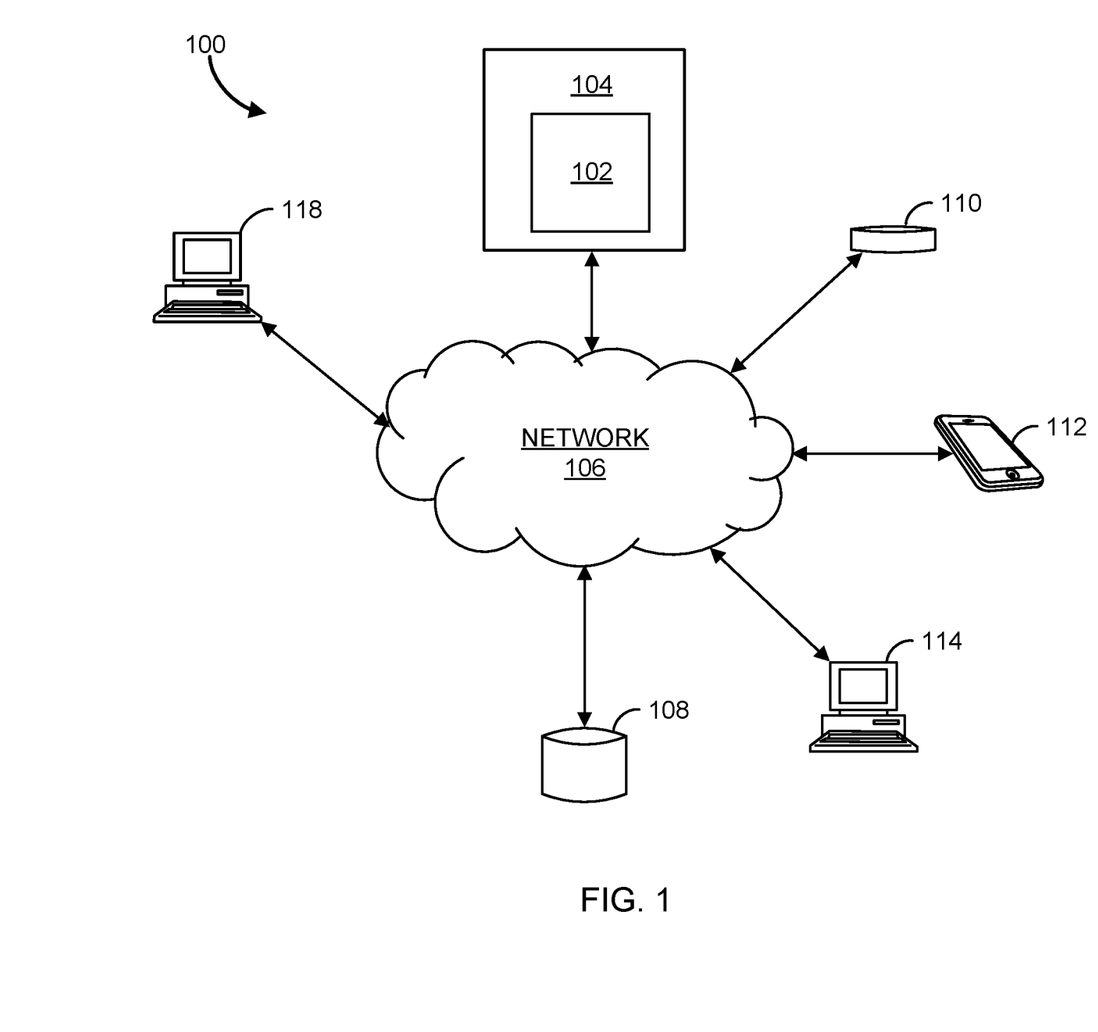
FIG. 1 is a functional block diagram of a data processing environment, in accordance with one or more embodiments.

FIG. 1 is a functional block diagram of a data processing environment 100. FIG. 1 provides only an illustration of one implementation and does not imply any limitations with regard to the environments in which different embodiments may be implemented. Many modifications of the depicted environment may be made by those skilled in the art without departing from the scope of the claims. In one or more cases, the data processing environment 100 includes a server 104, which operates a query intent mapping system 102 (hereinafter "system 102"), a data storage repository 108, and one or more computing devices, such as computing device 118 and customer devices 110, 112, and 114 coupled over a network 106. The server 104, system 102, data storage repository 108, and devices 110, 112, 114, and 118 can each be any suitable computing device that includes any hardware or hardware and software combination for processing and handling information, and transmitting and receiving data among the server 104, system 102, data storage repository 108, and devices 110, 112, 114, and 118.

The server 104, system 102, data storage repository 108, and devices 110, 112, 114, and 118 can each include one or more processors, one or more field-programmable gate arrays (FPGAs), one or more application-specific integrated circuits (ASICs), one or more state machines, digital circuitry, or any other suitable circuitry.

The network 106 interconnects the server 104, the data storage repository 108, and one or more of the devices 110, 112, and 114. In general, the network 106 can be any combination of connections and protocols capable of supporting communication between the server 104, the data storage repository 108, one or more of the computing devices 110, 112, 114, and 118, and the system 102. For example, the network 106 may be a WiFi® network, a cellular network such as a 3GPP® network, a Bluetooth® network, a satellite network, a wireless local area network (LAN), a network utilizing radio-frequency (RF) communication protocols, a Near Field Communication (NFC) network, a wireless Metropolitan Area Network (MAN) connecting multiple wireless LANs, a wide area network (WAN), or any other suitable network. In one or more cases, the network 106 may include wire cables, wireless communication links, fiber optic cables, routers, switches, firewalls, or any combination that can include wired, wireless, or fiber optic connections known by those skilled in the art.

In one or more cases, the server 104 hosts the system 102. In some cases, the server 104 may be a web server, a blade server, a mobile computing device, a laptop computer, a tablet computer, a netbook computer, a personal computer (PC), a desktop computer, or any programmable electronic device or computing system capable of receiving and sending data, via the network 106, and performing computer-readable program instructions. For example, for the cases in which the server 104 is a web server, the server 104 may host one or more pages of a website. Each of the computing devices 110, 112, 114, and 118 may be operable to view, access, and interact with the web pages hosted by the server 104. In one or more examples, the server 104 hosts a website, such as an e-commerce website, for a retailer to sell items and for a customer to purchase an item via one or more web pages. For example, a user of a computing device, such as the computing device 110, 112, or 114, may access a web page, add one or more items to an online shopping cart, and perform an online checkout of the shopping cart to purchase the items. In another example, a user of the computing device 118 may access one or more aspects of the system 102, for instance, to upload an item to the e-commerce website. In other cases, the server 104 can be a data center, which includes a collection of networks and servers, such as virtual servers and applications deployed on virtual servers, providing an external party access to the system 102. In some other cases, the server 104 represents a computing system utilizing clustered computers and components (e.g., database server computer, application server computers, etc.) that act as a single pool of seamless resources, such as in a cloud computing environment, when accessed within data processing environment 100.

In one or more cases, the data storage repository 108 may store data including, but not limited to, one or more queries, product type data of the queries, sequence attribute data, sequence value data, catalog data of items listed for sale on the e-commerce website, catalog attribute data, catalog value data, engagement data, cumulative engagement data, evaluation scores. Engagement data may include view data, historical transaction data, add-to-cart data, and/or other like data that tracks customer interaction with items on the e-commerce website. View data may be data that corresponds to a number of times customers viewed an item. Historical transaction data may be data that corresponds to the purchase history of an item. For example, historical transaction data may be data that indicates how many times customers purchased the item and/or when customers purchased the item. Add-to-cart data may be data that corresponds to an instance in which a customer adds an item to an on-line shopping cart.

In one or more cases, the data storage repository 108 may be one of, a web server, a mobile computing device, a laptop computer, a tablet computer, a netbook computer, a personal computer (PC), a desktop computer, or any programmable electronic device or computing system capable of receiving, storing, sending data, and performing computer readable program instructions capable of communicating with the server 104, computing devices 110, 112, 114, and 118, via network 106. In one or more cases, the data storage repository 108 may represent virtual instances operating on a computing system utilizing clustered computers and components (e.g., database server computer, application server computers, etc.) that act as a single pool of seamless resources when accessed within data processing environment 100. In one or more cases, the data storage repository 108 may be a remote storage device. In one or more other cases, the data storage repository 108 may be a local storage device on the server 104. For example, the data storage repository 108 may be, but not limited to, a hard drive, non-volatile memory, or a USB stick.

In one or more cases, devices 110, 112, 114, and 118 are clients to the server 104. The devices 110, 112, 114, and 118 may be, for example, a desktop computer, a laptop computer, a tablet computer, a personal digital assistant (PDA), a smart phone, a thin client, a voice assistant device, a digital assistant, or any other electronic device or computing system capable of communicating with server 104 through network 102. For example, device 118 may be a desktop computer capable of connecting to the network 106 to upload an item to the system 102. In another example, the device 112 may be a mobile device capable of connecting to the network 106 and entering a query into a search field on the e-commerce website. In one or more cases, one or more of the devices 110, 112, 114, and 118 may be any suitable type of mobile device capable of running mobile applications, including smart phones, tablets, slate, or any type of device that runs a mobile operating system.

In one or more cases, one or more of the devices 110, 112, 114, and 118 includes a user interface for providing an end user with the capability to interact with the system 102. For example, an end user of the computing device 118 may access the system 102 through the user interface to upload an item to sell on the e-commerce website. A user interface refers to the information (such as graphic, text, and sound) a program presents to a user and the control sequences the user employs to control the program. The user interface can be a graphical user interface (GUI). A GUI may allow users to interact with electronic devices, such as a keyboard and mouse, through graphical icons and visual indicators, such as secondary notations, as opposed to text-based interfaces, typed command labels, or text navigation. For example, the GUI may allow users to view, access, and interact with a website hosted on the server 104.

In one or more cases, one or more of the devices 110, 112, 114, and 118 can be any wearable electronic device, including wearable electronic devices affixed to, for example but not limited to, eyeglasses and sunglasses, helmets, wristwatches, clothing, and the like, and capable of sending, receiving, and processing data. For example, the device 110 may be a wearable electronic device, such as a wristwatch, capable of accessing an e-commerce website and receiving an input to enter a query in a search field and/or add an item to a customer's cart on the e-commerce website.

Figure 2:
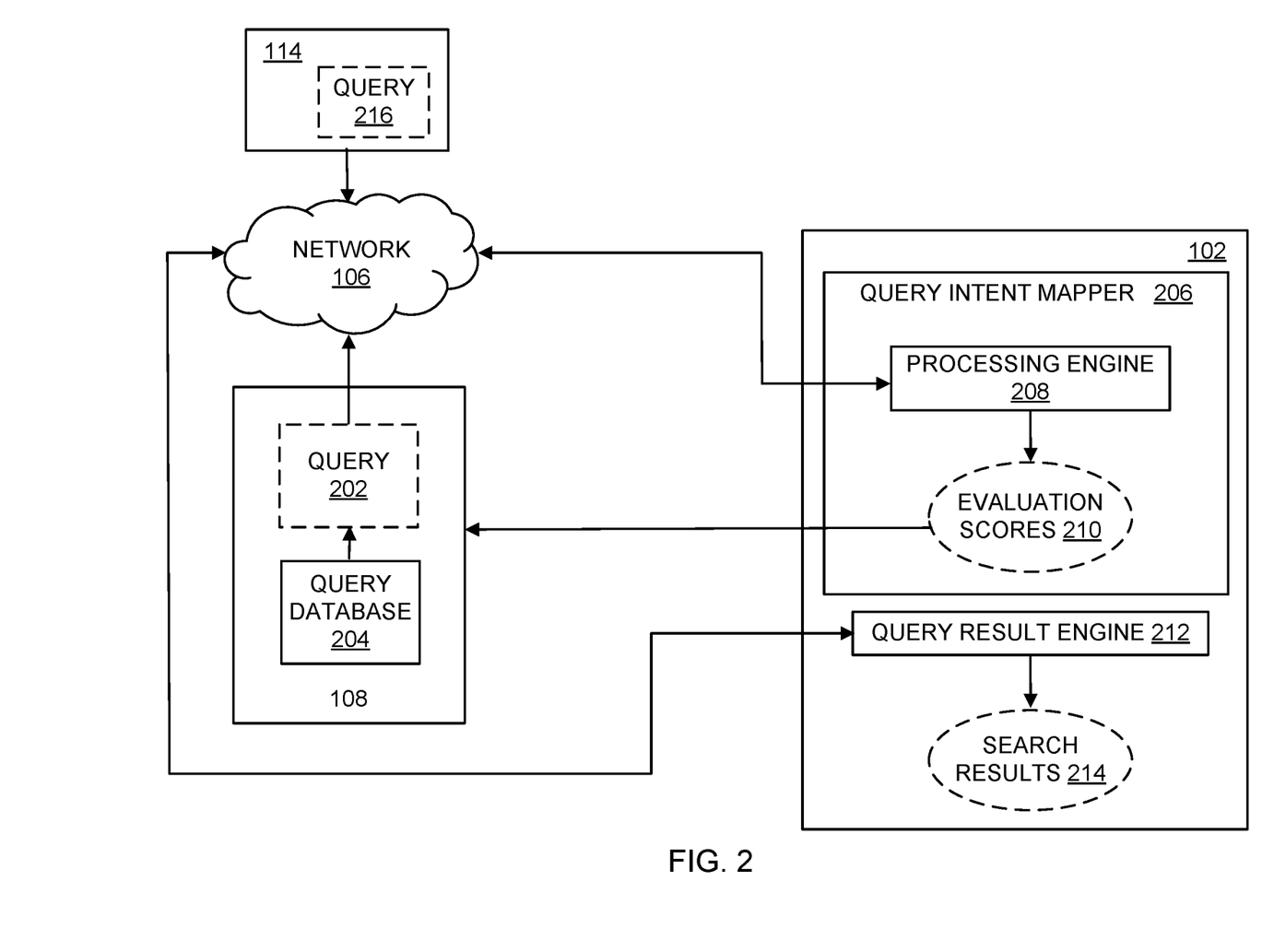
FIG. 2 is a functional block diagram illustrating components of the data processing environment of FIG. 1, in accordance with one or more embodiments.

FIG. 2 is a functional block diagram illustrating components of the data processing environment 100 of FIG. 1.

In one or more cases, the data storage repository 108 includes one or more databases for storing information. For example, the data storage repository 108 may include a query database 204. The query database 204 may store one or more queries, product type data of the queries, sequence attribute data, and sequence value data. It is noted that FIG. 2 illustrates the query database 204 as singular database localized on the data storage repository 108; however, it should be understood that the data stored within the query database 204 may be stored on more than one database that are either local to or remote from the data storage repository 108.

In one or more cases, the system 102 includes query intent mapper 206 and a query result engine 212. In one or more cases, the query intent mapper 206 includes a processing engine 208. In one or more examples, the processing engine 208 and/or the query results engine 212 may be implemented in hardware. In one or more examples, the processing engine 208 and/or the query results engine 212 may be implemented as an executable program maintained in a tangible, non-transitory memory, such as instruction memory 1007 of FIG. 10, which may be executed by one or processors, such as processor 1001 of FIG. 10.

Figure 3:
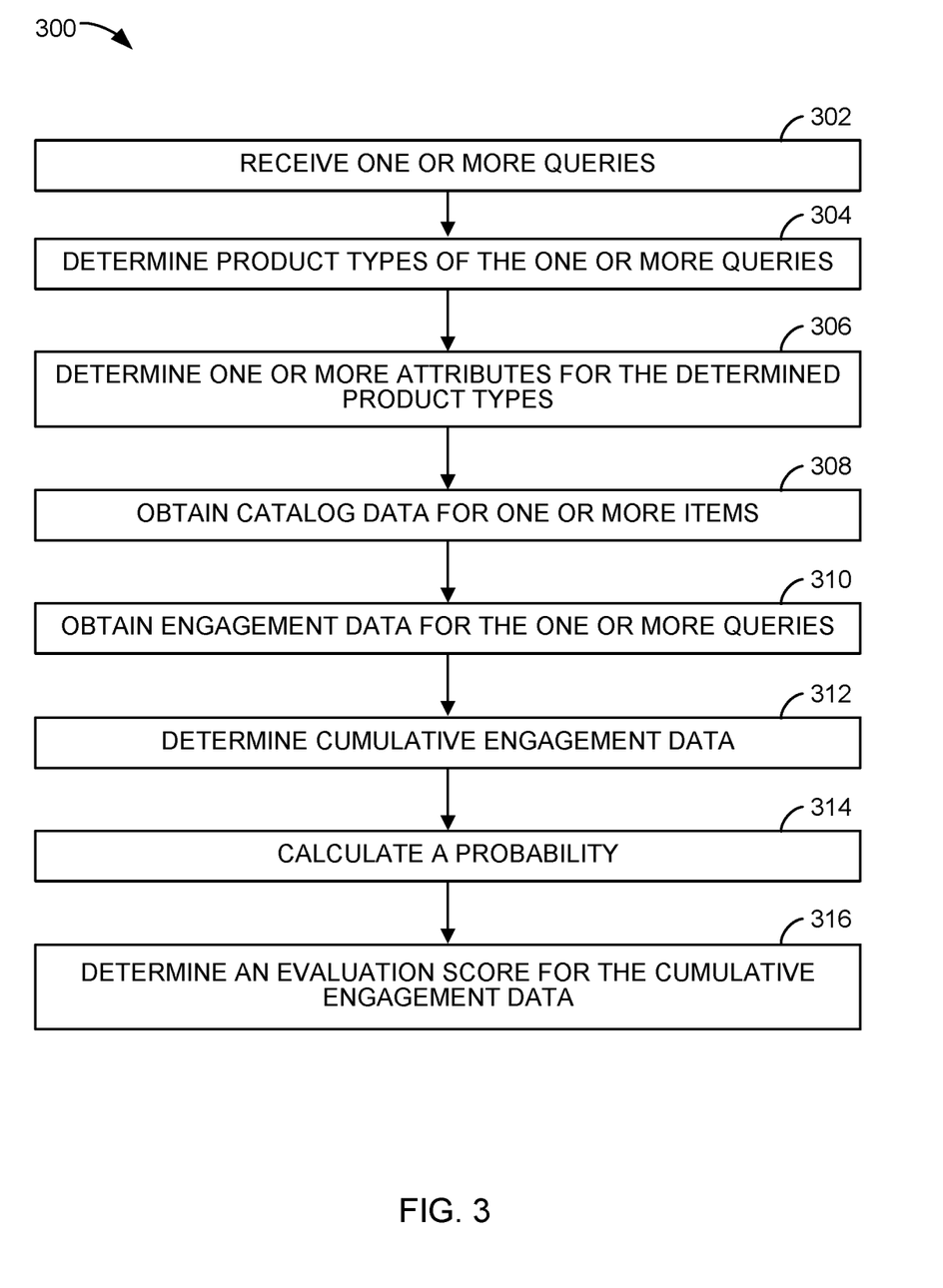
FIG. 3 is a flowchart illustrating a process of mapping query intent, in accordance with one or more embodiments.
Figure 4:
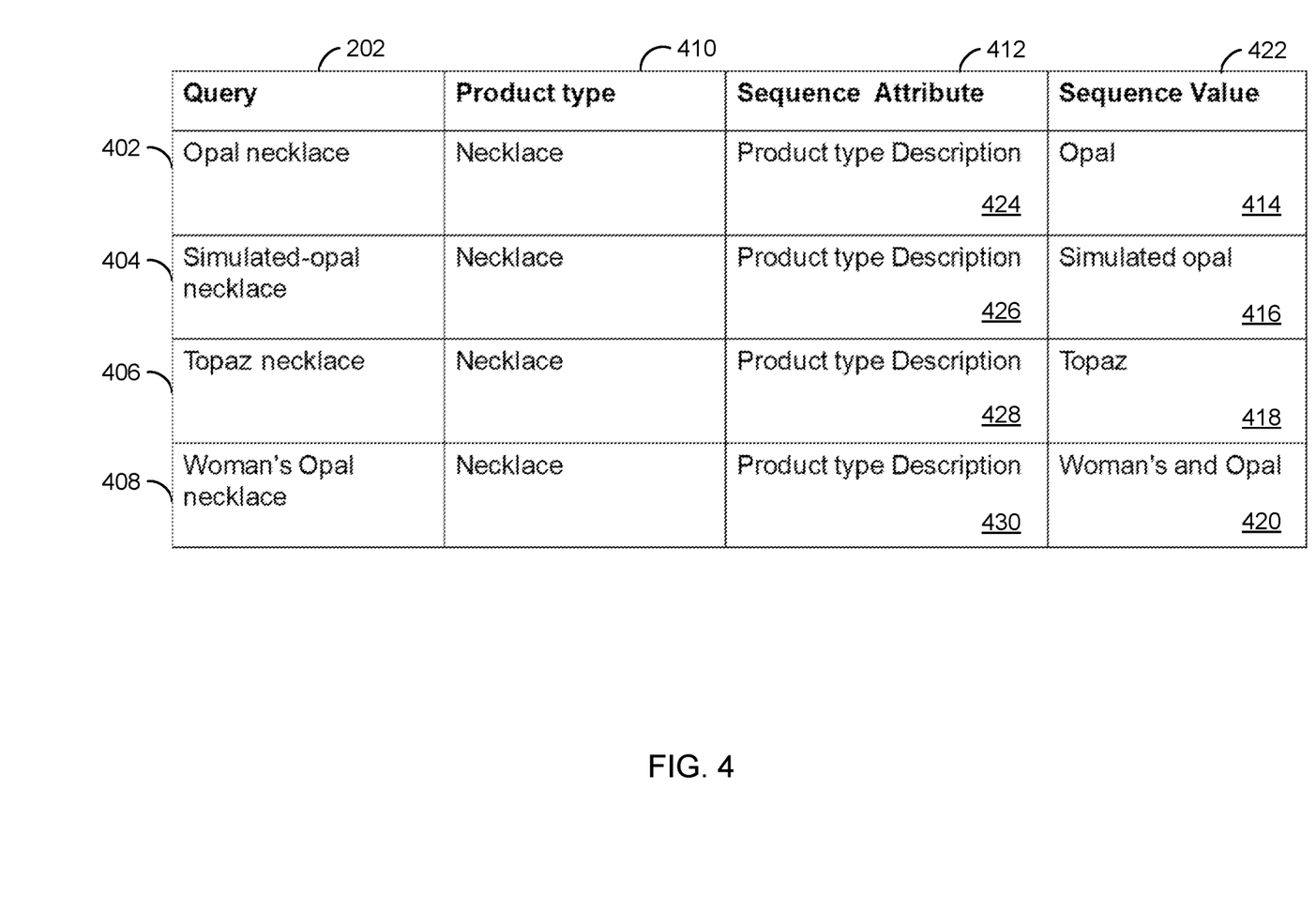
FIG. 4 illustrates example queries.
Figure 5:
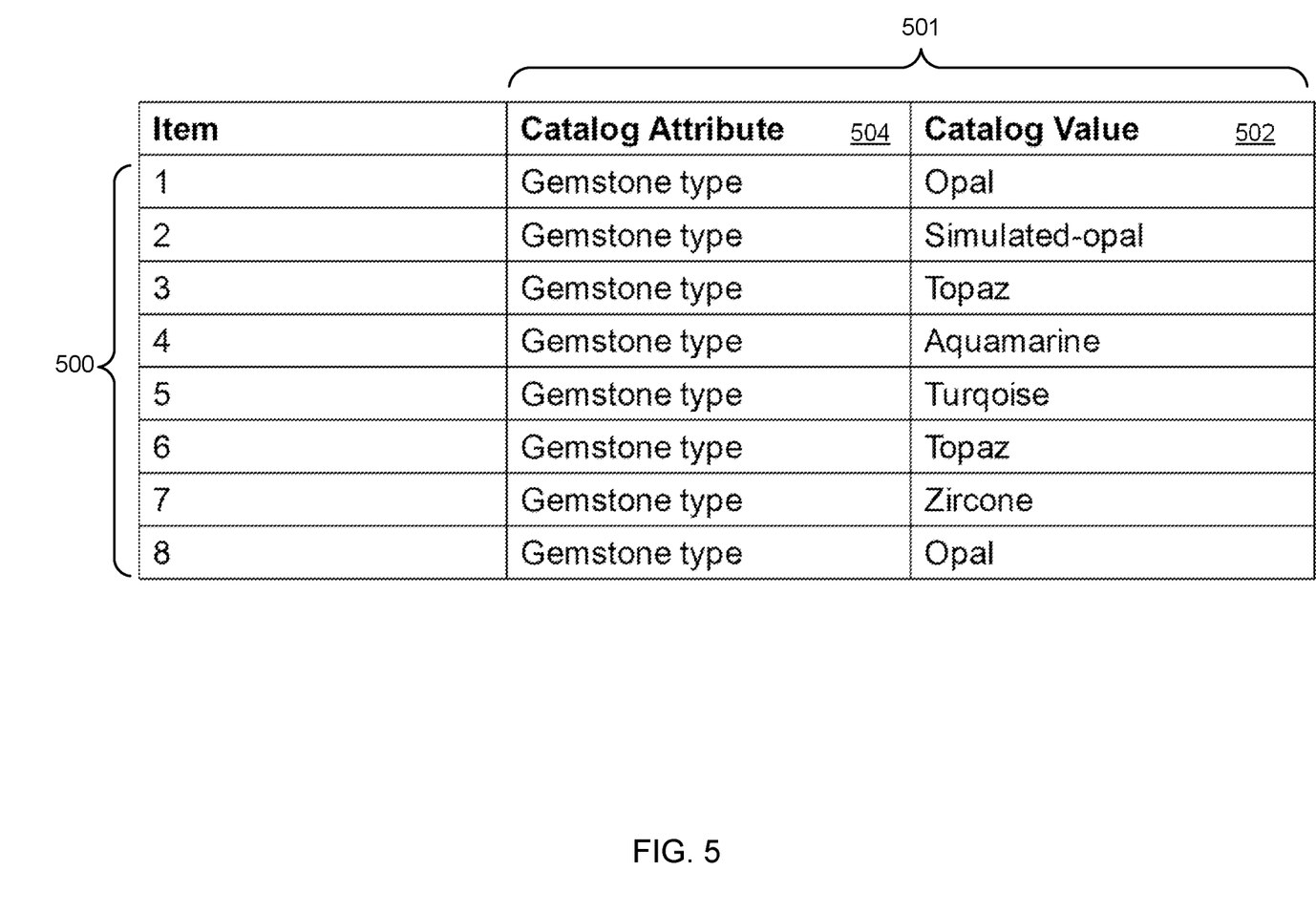
FIG. 5 illustrates example item information.
Figure 6:
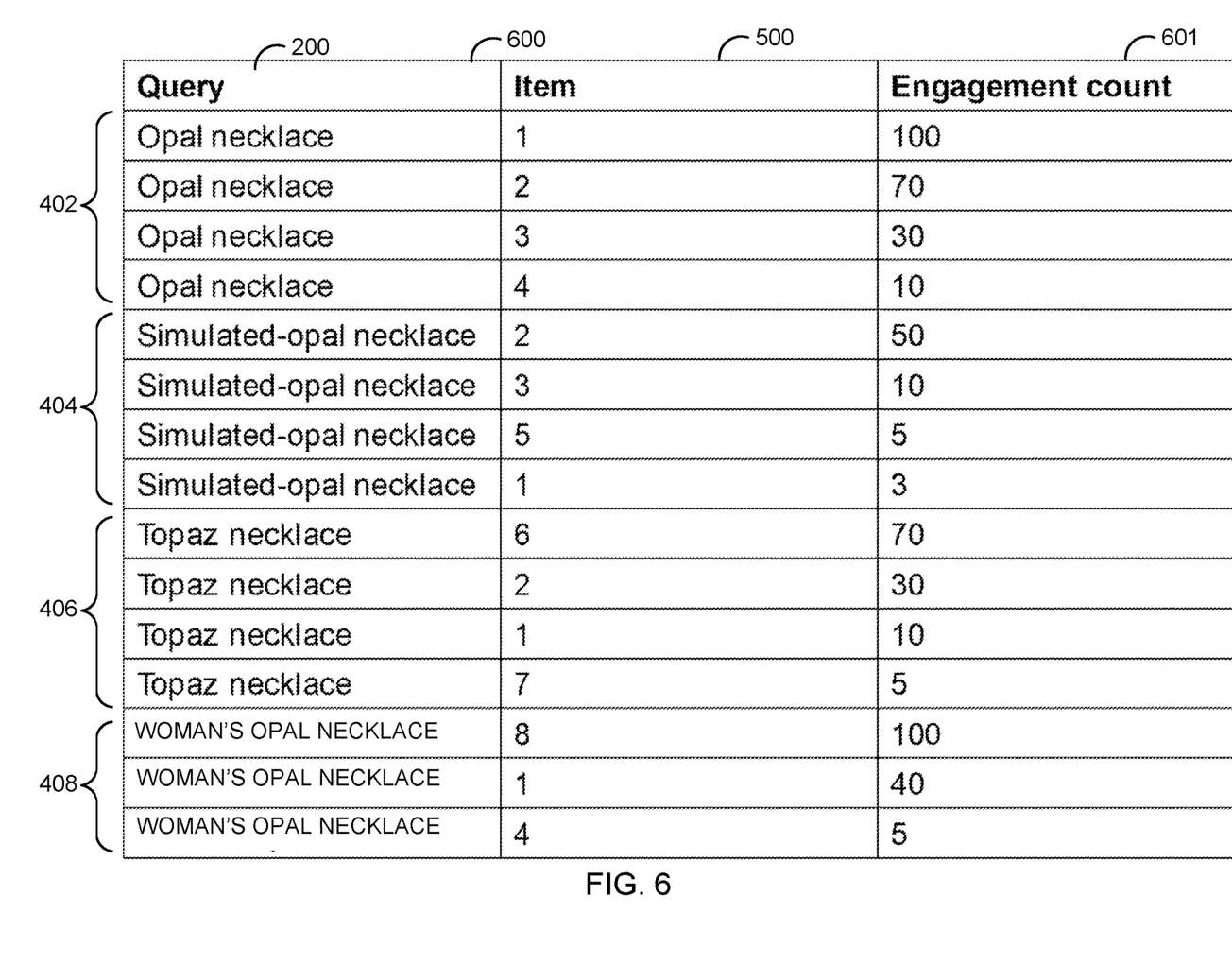
FIG. 6 illustrates an example query item engagement log.

FIG. 3 is a flowchart illustrating a process 300 of mapping query intent. FIG. 4 illustrates example queries. FIG. 5 illustrates example item information. FIG. 6 illustrates an example query item engagement log 600.

It is noted that, while the examples discussed herein are directed to searching for necklaces within a jewelry category of an e-commerce website, the embodiments discussed herein may be used to search for any type of product offered for sale, and are not limited to searching only for jewelry products. Moreover, the embodiments discussed herein may be directed to searching for any type of product within any category of the e-commerce website.

One or more queries 202 are received (302), preferably by the system 102. In one or more cases, the query intent mapper 206, and more preferably, the processing engine 208, receives the one or more queries 202. The processing engine 208 may receive the one or more queries 202 from the query database 204. For example, the processing engine 208 may receive queries, such as, but not limited to, "opal necklace" query 402, "simulated-opal necklace" query 404, "topaz necklace" query 406, and "woman's opal necklace" query 408, as shown in FIG. 4. The one or more queries 202 may be queries that customers previously entered into a search field of the e-commerce website and/or may be predetermined queries for one or more items.

Product types for the one or more queries 202 are determined (304), preferably by the processing engine 208. In one or more cases, the processing engine 208 determines the product types for the one or more queries 202 by tagging the one or more queries using a product type classification method, which outputs the determined product type. For example, the processing engine 208 may apply a product type classification method to the one or more queries 202, which tags "necklace" as the product type 410 for each of the queries 206. In one or more cases, to determine the product type, the product type classification method may parse a query and use a lookup table stored in the storage repository 108 to match the parsed text of the query to a product type in the lookup table. In one or more cases, a product type may refer to data classifying an item to a type of product within the product catalog. Other example product type descriptors may include, for example, but not limited to, "wedding rings," "wristwatches," "wristwatch bands," and the like. In one or more cases, the product type classification method may tag product types for one category of products, for example, but not limited to, a jewelry category. In one or more other cases, the product type classification method may tag product types for more than one category of products, for example, but not limited to, a jewelry category and an electronic devices category.

One or more attributes for the determined product types are determined (306), preferably by the processing engine 208. In one or more cases, the processing engine 208 determines the one or more attributes, within a received query, of the determined product type by tagging the query with a sequence tagger. By tagging the query via a sequence tagger, the processing engine 208 determines one or more attributes that include a sequence attribute 412 and a sequence value 422. A sequence attribute 412 may be data that includes a category and/or type of attribute, for example, but not limited to, a description of the product, a size of the product, a color of the product, an age type of the product, and the like. A sequence value 422 may be data that indicates the specific category and/or type of attribute, for example, but not limited to, cases in which a sequence attribute is a description of the product (e.g., the sequence value may be jade); cases in which a sequence attribute is a size of the product (e.g., the sequence value may be size 13); cases in which a sequence attribute is an age type of the product (e.g., the sequence value is a product for teenagers); and cases in which a sequence attribute is a color of the product (e.g., a sequence value may be rose gold).

In an example of sequence tagging a query, the processing engine 208 may tag query 402 and determine that the attribute of the "necklace" product type 410 includes a "product type description" 424 as a sequence attribute 412 and "opal" 414 as a sequence value 422. In another example, the processing engine 208 may tag query 404 and determine that the attribute of the "necklace" product type 410 includes a "product type description" 426 as a sequence attribute 412 and "simulated-opal" 416 as a sequence value 422. In another example, the processing engine 208 may tag query 406 and determine that the attribute of the "necklace" product type 410 includes a "product type description" 426 as a sequence attribute 412 and "topaz" 418 as a sequence value 422. In yet another example, the processing engine 208 may tag query 408 and determine that the attributes of the "necklace" product type 410 includes a "product type description" 430 as a sequence attribute 412 and "women" and "opal" 420 as a sequence value 422. In one or more cases, the processing engine 208 may utilize the tagged attributes to determine the intent token of the query. For example, based on the product type and attribute of the query 402, the processing engine 208 may determine that the intent of the query is to search for necklaces that include an opal gemstone type.

Catalog data 501 for one or more items 500 is obtained (308), preferably by the processing engine 208. In one or more cases, the processing engine 208 may obtain the catalog data 501 for the one or more items 500 that correspond to the determined product type of the one or more queries 202. For example, the processing engine 208 may retrieve the items 500, e.g., items 1, 2, 3, 4, 5, 6, 7 and 8 that correspond to the necklace product type 410. The processing engine 208 may retrieve the one or more items 500 from the data storage repository 108. The one or more items 500 may be items listed for sale on the e-commerce website. For example, the items 1, 2, 3, 4, 5, 6, 7, and 8 may be different types of necklaces. Catalog data 501 may include a catalog attribute 504 and a catalog value 502. A catalog attribute 504 may be data that includes a category and/or type of attribute for an item listed within the catalog. A catalog value 422 may be data that indicates the specific category and/or type of catalog attribute. For example, as illustrated in FIG. 5, item 1 includes data indicating that "gemstone type" is the catalog attribute 504, and "opal" is a catalog value 502.

Engagement data for the one or more queries 202 is obtained (310), preferably by the processing engine 208. In one or more cases, the processing engine 208 obtains engagement data from the data storage repository 108. The processing engine 208 may retrieve the engagement data for a period of time, such as 1 year. The engagement data may include a number of times (e.g., the engagement count 601) customers interacted with an item on the e-commerce website over a period of time when the system 102 provided the item as a search result for a given query. In an example, over a time period, the system 102 presented items 1, 2, 3, and 4 to customers on the e-commerce website as results for query 402. For query 402, the processing engine 208 may obtain engagement data that indicates customers engaged with item 1 one hundred times over the time period, with item 2 seventy times over the time period, with item 3 thirty times over the time period, and with item 4 ten times over the time period. In another example, over the time period, the system 102 presented items 2, 3, 5, and 1 to customers on the e-commerce website as results for query 404. For query 404, the processing engine 208 may obtain engagement data that indicates that customers engaged with item 2 fifty times over the time period, with item 3 ten times over the time period, with item 5 five times over the time period, and with item 1 three times over the time period. In another example, over a time period, the system 102 presented items 6, 2, 1, and 7 to customers on the e-commerce website as results for query 406. For query 406, the processing engine 208 may obtain engagement data that indicates that customers engaged with item 6 seventy times over the time period, with item 2 thirty times over the time period, with item 1 ten times over the time period, and with item 7 five times over the time period. In yet another example, over a time period, the system 102 presented items 8, 1, and 4 to customers on the e-commerce website as results for query 408. For query 408, the processing engine 208 may obtain engagement data that indicates that customers engaged with item 8 one hundred times over the time period, with item 1 forty times over the time period, and with item 4 five times over the time period. In one or more cases, a customer may engage with an item by, for example, but not limited to, by viewing the item on the e-commerce website (i.e., view data), purchasing the item on the e-commerce website (i.e., historical transaction data), adding the item to the customer's online shopping cart (i.e., add-to-cart-data), and the like. As such, engagement data may include view data, historical transaction data, add-to-cart data, and/or other like data that tracks customer interaction with items on the e-commerce website.

Cumulative engagement data is determined (312), preferably by the processing engine 208. In one or more cases, the processing engine 208 determines the cumulative engagement data by combining the engagement data for the sequence attribute 412 and sequence value 420 with the catalog attribute 504 and the catalog value 502, and generating a cumulative engagement count 700. In one or more cases, the cumulative engagement data includes a cumulative number of times (e.g., the cumulative engagement count 700) customers interacted with an item that includes a particular sequence attribute 412, sequence value 420, catalog attribute 504, and catalog value 502 for a given product type 410. For instance, in an example evaluation set 702 shown in FIG. 7, the processing engine 208 may determine that the cumulative engagement count 700 for a necklace product type that includes a product type description sequence attribute, an opal sequence value, a gemstone type catalog attribute, and an opal catalog value is 240. That is, the cumulative engagement count is the sum of the engagement count 100 for the opal necklace query and the provided item 1, the engagement count 100 for the woman's opal necklace query and the provided item 8, and the engagement count 40 for the woman's opal necklace query and the provided item 1. In example evaluation set 704, the processing engine 208 may determine that the cumulative engagement count 700 for a necklace product type that includes a product type description sequence attribute, an opal sequence value, a gemstone type catalog attribute, and a simulated-opal catalog value is 30. In example evaluation set 706, the processing engine 208 may determine that the cumulative engagement count 700 for a necklace product type that includes a product type description sequence attribute, an opal sequence value, a gemstone type catalog attribute, and a topaz catalog value is 30. In example evaluation set 708, the processing engine 208 may determine that the cumulative engagement count 700 for a necklace product type that includes a product type description sequence attribute, an opal sequence value, a gemstone type catalog attribute, and an aquamarine catalog value is 15.

Figure 8:
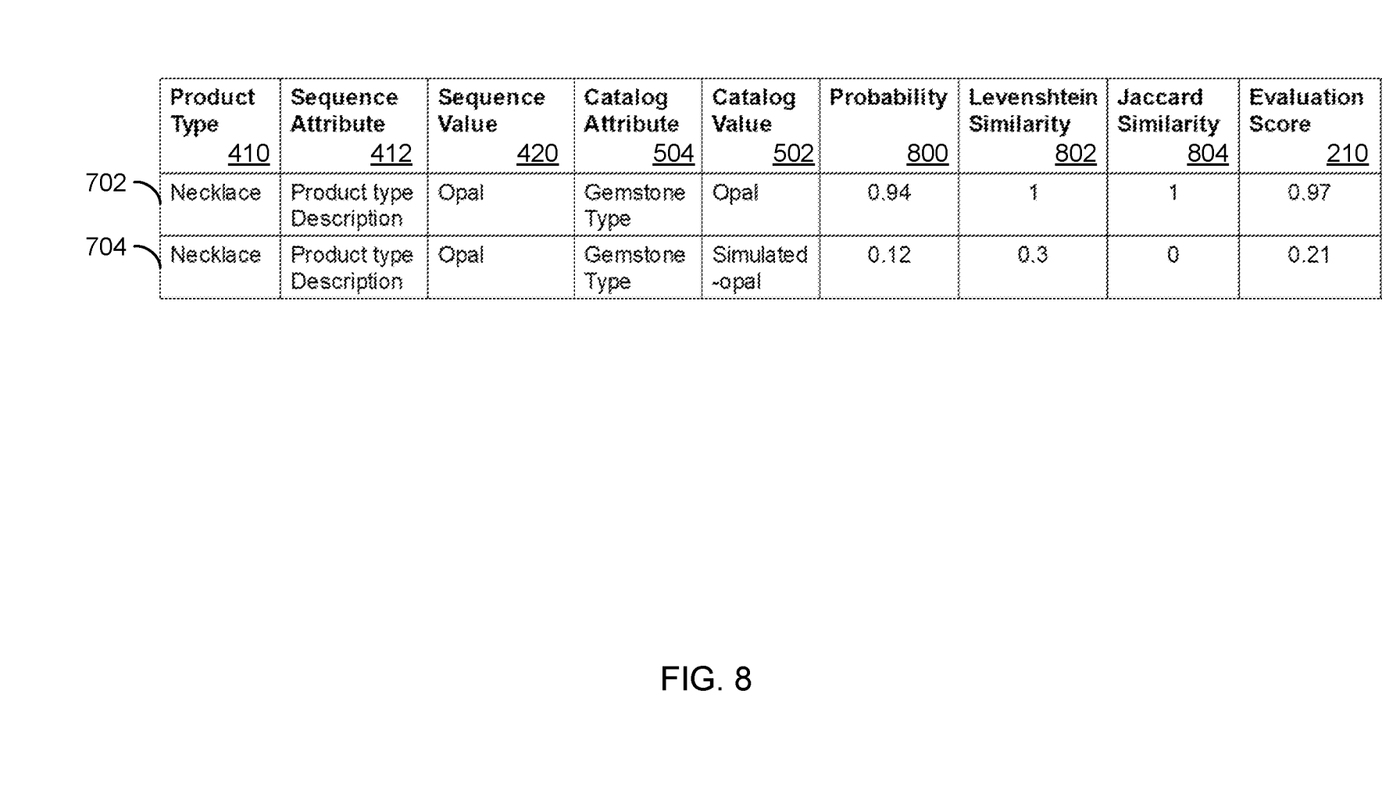
FIG. 8 illustrates example score calculations for one or more items.

A probability 800 is calculated (314), preferably by the processing engine 208. In one or more cases, the processing engine 208 determines a probability 800 that a query matches a description of an item within the product catalog. In one or more cases, the probability 800 is used to indicate a degree in which a sequence attribute 412 and sequence value 420 correspond to a catalog attribute 504 and a catalog value 502. In one or more cases, the processing engine 208 calculates the probability 800 as follows:

$$P(S_{attr}, S_{val} | C_{attr}, C_{val}) = \frac{P(S_{attr}, S_{val}, C_{attr}, C_{val})}{P(C_{attr}, C_{val})} = \frac{ATC(S_{attr}, S_{val}, C_{attr}, C_{val})}{ATC(C_{attr}, C_{val})}$$

in which $S_{attr}$ is a sequence attribute, $S_{val}$ is a sequence value, $C_{attr}$ is a catalog attribute, and $C_{val}$ is a catalog value. ATC may represent add-to-cart data that corresponds to a type of customer engagement. However, it should be noted that other types of engagement data, such as view data and/or purchase data, may be included in the probability calculation.

Figure 7:
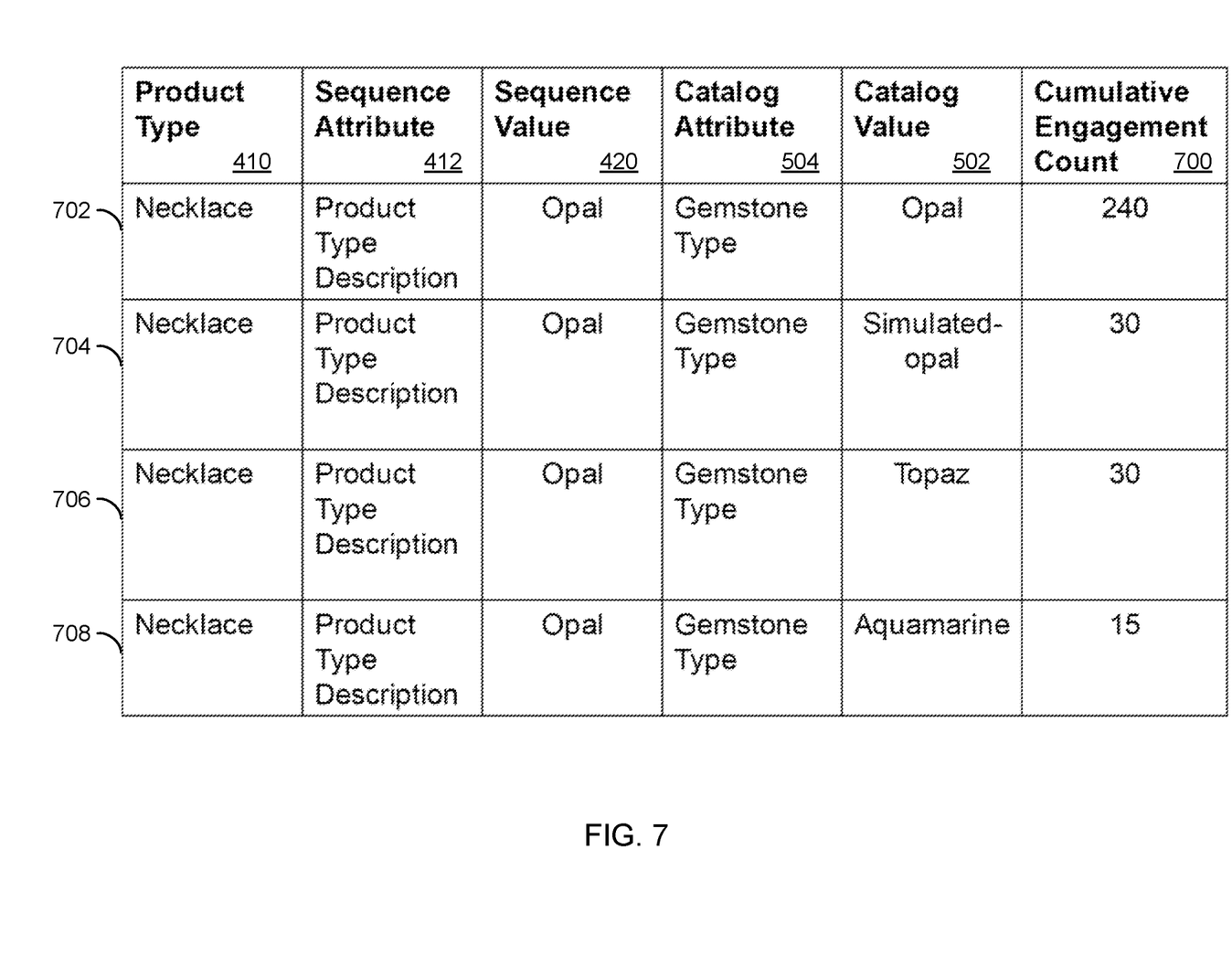
FIG. 7 illustrates cumulative engagement examples for one or more items.

In an example, the processing engine 208 may determine that the probability for evaluation set 702 (i.e., a necklace product type that includes a product type description sequence attribute, an opal sequence value, a gemstone type catalog attribute, and an opal catalog value) is 0.94. The processing engine 208 may calculate the probability for evaluation set 702 as follows:

$$P(S_{attr} = \text{product type desc}, S_{val} = \text{opal} \mid C_{attr} = \text{gemstonetype}, C_{val} = \text{opal}) = \frac{P(S_{attr} = \text{product type desc}, S_{val} = \text{opal}, C_{attr} = \text{gemstonetype}, C_{val} = \text{opal})}{P(C_{attr} = \text{gemstonetype}, C_{val} = \text{opal})}$$

$$= \frac{240}{253} = 0.94$$

$P(C_{attr}=\text{gemstonetype}, C_{val}=\text{opal})$ may represent the total engagement count for items, such as items 1 and 8, that include the opal gemstone. In another example, the processing engine 208 may determine that the probability for evaluation set 704 (i.e., a necklace product type that includes a product type description sequence attribute, an opal sequence value, a gemstone type catalog attribute, and a simulated-opal catalog value) is 30. The processing engine 208 may calculate the probability for the evaluation set 704 as follows:

$$P(S_{attr} = \text{product type desc}, S_{val} = \text{simulated\_topaz} \mid C_{attr} = \text{gemstonetype}, C_{val} = \text{opal}) = \frac{30}{253} = 0.12$$

An evaluation score 210 may be determined for the cumulative engagement data (316), preferably by the processing engine 208. In one or more cases, the processing engine 208 may determine the evaluation score 210 via combining string match level features and the calculated probability for the cumulative engagement data of an evaluation set. In one or more cases, the evaluation score 210 is used to map a sequence attribute 412 and sequence value 420 to a catalog attribute 504 and a catalog value 502. In one or more cases, a higher evaluation score 210 for an evaluation set may indicate a stronger match of a sequence attribute 412 and sequence value 420 to a catalog attribute 504 and a catalog value 502. In one or more cases, a lower evaluation score 210 for an evaluation set may indicate a weaker match of a sequence attribute 412 and sequence value 420 to a catalog attribute 504 and a catalog value 502.

In one or more cases, the processing engine 208 may calculate the score as follows:

$$\text{score}(pt, S_{attr}, S_{val}, C_{attr}, C_{val}) = \alpha * \max(JM, LM) + (1-\alpha) * nAT$$

in which α is used to provide equal weight to the string match level features and the calculated probability; JM is a Jaccard Match similarity; LD is a Levenshtein Distance similarity; and nATC is an aggregate number of add-to-cart engagement data. In an example, α may set to 0.5. In one or more cases, α may be tuned to provide the best F1 measure, i.e., the accuracy of an offline evaluation set. In one or more cases, nATC may be an aggregate number for other types of engagement data, such as view data and/or purchase data. In one or more other cases, nATC may be an aggregate number for a combination of two or more types of engagement data, such as add-to-cart date, view data, and purchase data. In one or more cases, the processing engine 208 may calculate JM as follows:

$$LM = 1.0 - \frac{\text{levenshtein\_distance}(pcs_{val}, st_{val})}{\max(len(pcs_{val}, st_{val})}$$

in which $pcs_{val}$ refers to a catalog value and $st_{val}$ refers to a sequence attribute. The processing engine 208 may calculate, for example, LM 802 to be 1 for the evaluation set 702, and 0.3 for the evaluation set 704. In one or more cases, the processing engine 208 may calculate JD as follows:

$$JM = 1.0 - \text{jaccard\_distance}(pcs_{val}, st_{val})$$

in which $pcs_{val}$ refers to a catalog value and $st_{val}$ refers to a sequence attribute. The processing engine 208 may calculate, for example, JD 804 to be 1 for the evaluation set 702, and 0 for the evaluation set 704.

Having determined the LM and JD for an evaluation set, the processing engine 208 may calculate the evaluation score 210 for the evaluation sets. For example, the processing engine 208 may calculate an evaluation score of 0.97 for the evaluation set 702, and an evaluation score of 0.21 for the evaluation set 704. In one or more cases, the processing engine 208 determines the evaluation scores 210 for the evaluation sets and stores the evaluation scores 210 in the data storage repository 108. In one or more cases, the system 102 may update the evaluation sets at a predetermined time period, for example, every day. In one or more other cases, the system may update the evaluation sets manually, for example, when an operator of the system 102 inputs one or more commands for the system 102 to perform the process 300. In one or more cases, the processing engine 208 may store the evaluation sets in a lookup table in the data storage repository 108.

In one or more cases, in a live environment, a customer may input a query 216, via for example computing device 114, into a search field of the e-commerce website. In one or more cases, a query result engine 212 may receive the query 216, and determine the search results 214 to provide for the query 216. In one or more cases, the query result engine 212 may determine the search results 214 for the query 214 by matching the text of a query 214 to the text of one or more items within a lookup table stored in the data storage repository 108. For the cases in which the query result engine 212 determines that the query 214 matches an evaluation set, the query search result engine 212 boosts the scores the items in the catalog that have attributes identified in the evaluation set. For example, if the query 114 is "opal necklace", the query result engine 212 may boost the scores for items in the catalog that correspond to the evaluation set 702. In one or more cases, the query result engine 212 may rank the items that are relevant to the query 114 based on their scores, and provide these ranked items as search results 214 to the e-commerce website that displays the ranked items on, for example, a search results page. A computing device, such as computing device 114 may display the ranked items on the search results page. In one or more other cases, the query search results engine 212 may use the boosted scores in combination with other factors to determine a ranking. For example, the boosted scores may be used in conjunction with models that recommend trending items for sale on the e-commerce website, and/or with models that recommend complementary items or upselling items to items within a customer's online shopping cart.

Figure 9:
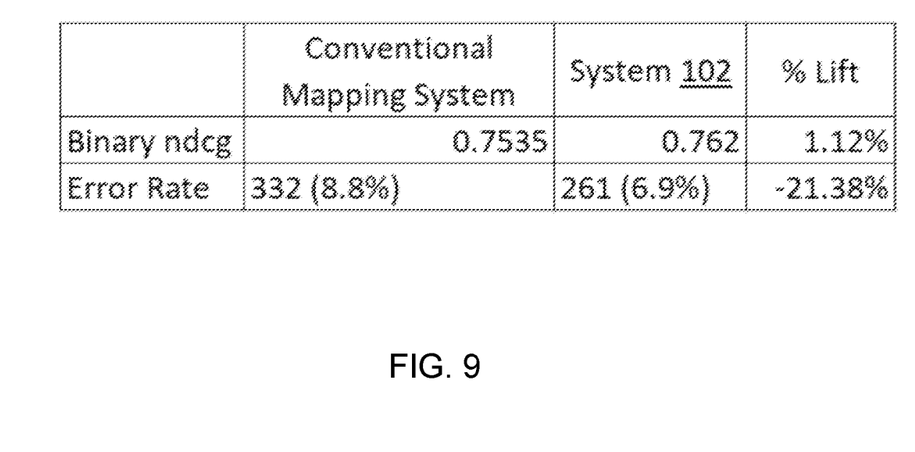
FIG. 9 illustrates a comparison example between the process of recommending items based on query intent mapping and conventional mapping systems.

FIG. 9 illustrates a comparison example between the process of recommending items based on query intent mapping and conventional mapping systems. To generate the relevance evaluation scores in FIG. 9, a weightage for a string match is 0.59α, a weightage for a confidence value is 0.41α, F1 is 0.85, precision is 0.88, and recall is 0.82. In one or more examples, as compared to a conventional mapping system, the process 300 of the system 102 increased the binary normalized discounted gain (ndcg) by an average of 1.12%. That is, the process 300 increases the quality of ranked items in the provided search results. In one or more cases, as compared to a conventional mapping system, the process 300 of the system 102 decreased the error rate by an average of 21.38%. That is, the process 300 decreases the error in which the attributes of a query are incorrectly determined or mapped to attributes of items within a catalog.

Figure 10:
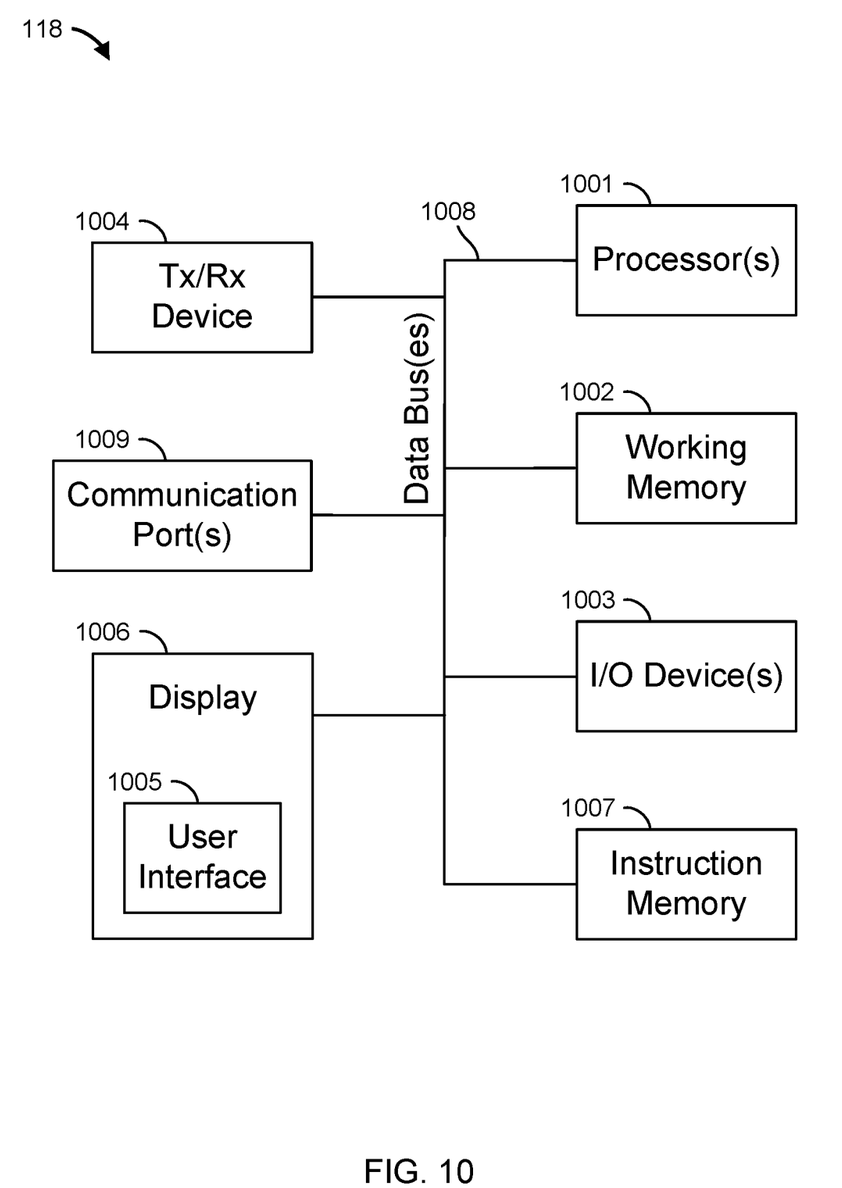
FIG. 10 depicts a block diagram of components of a computing device capable of performing the processes described herein, in accordance with one or more embodiments.

FIG. 10 depicts a block diagram of components of a computing device capable of performing the processes described herein. In particular, FIG. 10 illustrates an example computing device, such as computing device 118, capable of interacting with the system 102 of FIG. 1.

Computing device 118 can include one or more processors 1001, working memory 1002, one or more input/output devices 1003, instruction memory 1007, a transceiver 1004, one or more communication ports 1009, and a display 1006, all operatively coupled to one or more data buses 1008. Data buses 1008 allow for communication among the various devices. Data buses 1008 can include wired, or wireless, communication channels.

Processors 1001 can include one or more distinct processors, each having one or more cores. Each of the distinct processors can have the same or different structure. Processors 1001 can include one or more central processing units (CPUs), one or more graphics processing units (GPUs), application specific integrated circuits (ASICs), digital signal processors (DSPs), and the like.

Processors 1001 can be configured to perform a certain function or operation by executing code, stored on instruction memory 1007, embodying the function or operation. For example, processors 1001 can be configured to perform one or more of any function, method, or operation disclosed herein.

Instruction memory 1007 can store instructions that can be accessed (e.g., read) and executed by processors 1001. For example, instruction memory 1007 can be a non-transitory, computer-readable storage medium such as a read-only memory (ROM), an electrically erasable programmable read-only memory (EEPROM), flash memory, a removable disk, CD-ROM, any non-volatile memory, or any other suitable memory.

Processors 1001 can store data to, and read data from, working memory 1002. For example, processors 1001 can store a working set of instructions to working memory 1002, such as instructions loaded from instruction memory 1007. Processors 1001 can also use working memory 1002 to store dynamic data created during the operation of system 102. Working memory 1002 can be a random access memory (RAM) such as a static random access memory (SRAM) or dynamic random access memory (DRAM), or any other suitable memory.

Input-output devices 1003 can include any suitable device that allows for data input or output. For example, input-output devices 1003 can include one or more of a keyboard, a touchpad, a mouse, a stylus, a touchscreen, a physical button, a speaker, a microphone, or any other suitable input or output device.

Communication port(s) 1009 can include, for example, a serial port such as a universal asynchronous receiver/transmitter (UART) connection, a Universal Serial Bus (USB) connection, or any other suitable communication port or connection. In some examples, communication port(s) 1009 allows for the programming of executable instructions in instruction memory 1007. In some examples, communication port(s) 1009 allow for the transfer (e.g., uploading or downloading) of data, such as transaction data.

Display 1006 can display user interface 1005. User interfaces 1005 can enable user interaction with, for example, computing device 112 or 118. For example, user interface 1005 can be a user interface for an application of a retailer that allows a customer to purchase one or more items from the retailer. In some examples, a user can interact with user interface 1005 by engaging input-output devices 1003. In some examples, display 1006 can be a touchscreen, in which the touchscreen displays the user interface 1005.

Transceiver 1004 allows for communication with a network, such as the communication network 118 of FIG. 1. For example, if network 106 of FIG. 1 is a cellular network, transceiver 1004 is configured to allow communications with the cellular network. In some examples, transceiver 1004 is selected based on the type of network 106 system 102 will be operating in. Processor(s) 1001 is operable to receive data from, or send data to, a network, such as network 106 of FIG. 1, via transceiver 1004.

Although the embodiments discussed herein are described with reference to the figures, it will be appreciated that many other ways of performing the acts associated with the embodiments can be used. For example, the order of some operations may be changed, and some of the operations described may be optional.

In addition, the embodiments described herein can be at least partially implemented in the form of computer-implemented processes and apparatus. The disclosed embodiments may also be at least partially implemented in the form of tangible, non-transitory machine-readable storage media encoded with computer program code. For example, the processes described herein can be implemented in hardware, in executable instructions executed by a processor (e.g., software), or a combination of the two. The media may include, for example, RAMs, ROMs, CD-ROMs, DVD-ROMs, BD-ROMs, hard disk drives, flash memories, or any other non-transitory machine-readable storage medium. When the computer program code is loaded into and executed by a computer, the computer becomes an apparatus for practicing the embodiments. The embodiments may also be at least partially implemented in the form of a computer into which computer program code is loaded or executed, such that, the computer becomes a special purpose computer for practicing the embodiments. When implemented on a general-purpose processor, the computer program code segments configure the processor to create specific logic circuits. The embodiments may alternatively be at least partially implemented in application specific integrated circuits for performing the embodiments.

The foregoing is provided for purposes of illustrating, explaining, and describing embodiments of this disclosure. Modifications and adaptations to the embodiments will be apparent to those skilled in the art and may be made without departing from the scope or spirit of the disclosure.

What is claimed is:

1. A system comprising:
a memory having instructions stored thereon, and a processor configured to read the instructions to:
receive query data for a search query;
parse the search query to determine one or more words comprising the search query;
determine product type data of the received search query based on at least the one or more words,
determine attribute data for the determined product type data, the attribute data comprising sequence attribute data and sequence value data;
retrieve catalog data for one or more items that include product type data that matches the determined product type data, the catalog data comprising catalog attribute data and catalog value data;
generate an evaluation set comprising the sequence attribute data, the sequence value data, the catalog attribute data, and the catalog value data;
determine engagement data for the received search query, the engagement data comprising a number of times customers previously interacted with a retrieved item for a respective query, wherein the previous interaction of customers with the retrieved item comprises adding the item to an online shopping cart;
generate cumulative engagement data based on the retrieved catalog data and the determined engagement data;
calculate a probability for the evaluation set, the probability indicating a degree in which sequence attribute data and sequence value data correspond to catalog attribute data and catalog value data;
generate an evaluation score for the evaluation set, the evaluation score being based on the cumulative engagement data and the probability;
map the evaluation score to a plurality of responsive items that are responsive to the received search query such that a responsive evaluation score is generated for each item of the plurality of responsive items that corresponds to the evaluation set;
generate a ranked order of the plurality of responsive items based on the responsive evaluation score of each item of the plurality of responsive items;
modify the ranked order based on the search query corresponding to one or more items of the evaluation set; and
display, on a web based platform, the plurality of responsive items ranked based on the modified ranked order.

2. The system of claim 1, wherein the processor is further configured to determine the product type data by tagging a product type for the one or more queries.

3. The system of claim 1, wherein the processor is further configured to determine the attribute data by tagging the one or more queries with a sequence tagger.

4. The system of claim 1, wherein the interaction of customers with a retrieved item further comprises at least one of a customer viewing the retrieved item on an e-commerce website, or the customer purchasing the retrieved item on the e-commerce website.

5. The system of claim 1, wherein the processor is further configured to determine the cumulative engagement data by combining the sequence attribute data and sequence value data with the catalog attribute data and catalog value data, and generating a cumulative engagement count.

6. The system of claim 5, wherein the cumulative engagement count comprises a number of times customers interacted with a retrieved item that corresponds to the evaluation set.

7. The system of claim 1, wherein the processor is further configured to generate the evaluation score for the evaluation set by combining string match level features and the calculated probability.

8. The system of claim 5, wherein the processor is further configured to: receive a query input into a search field on an e-commerce website;
match the received query to an evaluation set; and
provide one or more items that correspond to the evaluation set as search results for the received query.

9. A method comprising:
receiving, by a processor, query data for a search query;
parsing, by the processor, the search query to determine one or more words comprising the search query;
determining, by the processor, product type data of the received search query based on at least the one or more words;
determining, by the processor, attribute data for the determined product type data, the attribute data comprising sequence attribute data and sequence value data;
retrieving, by the processor, catalog data for one or more items that include product type data that matches the determined product type data, the catalog data comprising catalog attribute data and catalog value data;
generating, by the processor, an evaluation set comprising the sequence attribute data, the sequence value data, the catalog attribute data, and the catalog value data;
determining, by the processor, engagement data for the received search query, the engagement data comprising a number of times customers previously interacted with a retrieved item for a respective query, wherein the previous interaction of customers with the retrieved item comprises adding the item to an online shopping cart;
generating, by the processor, cumulative engagement data based on the retrieved catalog data and the determined engagement data;
calculating, by the processor, a probability for the evaluation set, the probability indicating a degree in which sequence attribute data and sequence value data correspond to catalog attribute data and catalog value data;
generating, by the processor, an evaluation score for the evaluation set, the evaluation score being based on the cumulative engagement data and the probability;
mapping, by the processor, the evaluation score to a plurality of responsive items that are responsive to the received search query such that a responsive evaluation score is generated for each item of the plurality of responsive items that corresponds to the evaluation set;
generating, by the processor, a ranked order of the plurality of responsive items based on the responsive evaluation score of each item of the plurality of responsive items;
modifying, by the processor, the ranked order based on the search query corresponding to one or more items of the evaluation set; and
displaying, by the processor on a web based platform, the plurality of responsive items ranked based on the modified ranked order.

10. The method of claim 9, wherein determining the product type data comprises tagging a product type for the one or more queries.

11. The method of claim 9, wherein determining the attribute data comprises tagging the one or more queries with a sequence tagger.

12. The method of claim 9, wherein the interaction of customers with a retrieved item further comprises at least one of a customer viewing the retrieved item on an e-commerce website or the customer purchasing the retrieved item on the e-commerce website, or the customer adding the retrieved item to an online shopping cart.

13. The method of claim 9, wherein determining the cumulative engagement data comprises combining the sequence attribute data and sequence value data with the catalog attribute data and catalog value data, and generating a cumulative engagement count.

14. The method of claim 13, wherein the cumulative engagement count comprises a number of times customers interacted with a retrieved item that corresponds to the evaluation set.

15. The method of claim 13, further comprising: receiving a query input into a search field on an e-commerce website; matching the received query to an evaluation set; and
providing one or more items that correspond to the evaluation set as search results for the received query.

16. A computer program product comprising:
a non-transitory computer readable medium having program instructions stored thereon, the program instructions executable by one or more processors, the program instructions comprising:
receiving query data for a search query;
parsing the search query to determine one or more words comprising the search query;
determining product type data of the received search query based on at least the one or more words;
determining attribute data for the determined product type data, the attribute data comprising sequence attribute data and sequence value data;
retrieving catalog data for one or more items that include product type data that matches the determined product type data, the catalog data comprising catalog attribute data and catalog value data;
generating an evaluation set comprising the sequence attribute data, the sequence value data, the catalog attribute data, and the catalog value data;
determining engagement data for the received search query, the engagement data comprising a number of times customers previously interacted with a retrieved item for a respective query, wherein the previous interaction of customers with the retrieved item comprises adding the item to an online shopping cart;
generating cumulative engagement data based on the retrieved catalog data and the determined engagement data;
calculating a probability for the evaluation set, the probability indicating a degree in which sequence attribute data and sequence value data correspond to catalog attribute data and catalog value data;

generating an evaluation score for the evaluation set, the evaluation score being based on the cumulative engagement data and the probability;

mapping the evaluation score to a plurality of responsive items that are responsive to the received search query such that a responsive evaluation score is generated for each item of the plurality of responsive items that corresponds to the evaluation set;

generating a ranked order of the plurality of responsive items based on the responsive evaluation score of each item of the plurality of responsive items;

modifying the ranked order based on the search query corresponding to one or more items of the evaluation set; and displaying, on a web based platform, the plurality of responsive items ranked based on the modified ranked order.

17. The computer program product of claim 16, wherein the program instructions further comprise:

determining the cumulative engagement data comprises combining the sequence attribute data and sequence value data with the catalog attribute data and catalog value data, and generating a cumulative engagement count.

18. The computer program product of claim 17, wherein the cumulative engagement count comprises a number of times customers interacted with a retrieved item that corresponds to the evaluation set.

19. The computer program product of claim 17, wherein the program instructions further comprise:

receiving a query input into a search field on an e-commerce website; matching the received query to an evaluation set; and providing one or more items that correspond to the evaluation set as search results for the received query.

* * * * *